US009019913B2

(12) United States Patent
Madan et al.

(10) Patent No.: US 9,019,913 B2
(45) Date of Patent: Apr. 28, 2015

(54) METHODS AND APPARATUS FOR PROVIDING D2D SYSTEM INFORMATION TO A UE SERVED BY A HOME EVOLVED NODE-B

(75) Inventors: Ritesh K. Madan, Jersey City, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 353 days.

(21) Appl. No.: 13/476,515

(22) Filed: May 21, 2012

(65) Prior Publication Data

US 2013/0308552 A1 Nov. 21, 2013

(51) Int. Cl.
*H04W 4/00* (2009.01)
*H04W 48/12* (2009.01)
*H04W 76/02* (2009.01)
*H04W 84/10* (2009.01)
*H04L 5/00* (2006.01)

(52) U.S. Cl.
CPC ............ *H04W 48/12* (2013.01); *H04W 76/023* (2013.01); *H04W 84/105* (2013.01); *H04L 5/0023* (2013.01); *H04L 5/0094* (2013.01)

(58) Field of Classification Search
None
See application file for complete search history.

(56) References Cited

U.S. PATENT DOCUMENTS

| 2010/0009675 | A1* | 1/2010 | Wijting et al. ............. 455/426.1 |
| 2010/0169498 | A1 | 7/2010 | Palanki et al. |
| 2011/0058542 | A1* | 3/2011 | Nylander et al. ............. 370/338 |
| 2011/0098043 | A1 | 4/2011 | Yu et al. |
| 2011/0105131 | A1 | 5/2011 | Shaheen |
| 2011/0151878 | A1 | 6/2011 | Xu et al. |
| 2011/0235605 | A1 | 9/2011 | Yeoum et al. |
| 2011/0258327 | A1* | 10/2011 | Phan et al. ............. 709/227 |
| 2012/0093086 | A1* | 4/2012 | Yin et al. ............. 370/328 |
| 2012/0113843 | A1 | 5/2012 | Watfa et al. |
| 2012/0122472 | A1* | 5/2012 | Krishnamurthy et al. . 455/456.1 |
| 2012/0213183 | A1* | 8/2012 | Chen et al. ............. 370/329 |

FOREIGN PATENT DOCUMENTS

| EP | 2624627 A1 | 8/2013 |
| WO | 2012018824 A1 | 2/2012 |
| WO | 2012043523 A1 | 4/2012 |

OTHER PUBLICATIONS

International Search Report and Written Opinion—PCT/US2013/042053—ISA/EPO—Oct. 2, 2013.
Nokia, "Improving 4G coverage and capacity indoors and at hotspots with LTE femtocells," Nokia Siemens Networks, 2011, pp. 1-5.

* cited by examiner

*Primary Examiner* — Jutai Kao
(74) *Attorney, Agent, or Firm* — James K. O'Hare

(57) ABSTRACT

A method, an apparatus, and a computer program product for wireless communication are provided in which a network entity may be operable to communicate D2D resource allocations to a UE supported by a HeNB. In one example, the network entity may be operable to determine whether a HeNB is operable to communicate system information to a UE. As used herein, system information may include, but is not limited to, D2D resource allocations, paging information, etc. When the network entity determines that a HeNB is operable to communicate system information to a UE, then it may transmit the system information to the HeNB to allow the HeNB to convey the system information to the UE. When the network entity determines that a HeNB is not operable to communicate system information to a UE, then it may transmit the system information to the UE via one or more other network entities.

28 Claims, 16 Drawing Sheets

METHODS AND APPARATUS FOR PROVIDING D2D SYSTEM INFORMATION TO A UE SERVED BY A HOME EVOLVED NODE-B

BACKGROUND

1. Field

The present disclosure relates generally to communication systems, and more particularly, to a system to enable a user equipment (UE) served by a home evolved Node-B (HeNB) to determine resources allocated for device to device (D2D) communication between a pair of devices.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

The wireless communications system may include a plurality UEs and a plurality of evolved NodeBs (eNBs). The UEs may be associated with difference eNBs and the eNBs may be associated with different cells. Further, the eNBs may be associated with different power classes. For example, a macro eNB may be operable to provide service within a large geographical region and may receive and communicate system wide information. A HeNB may be operable to provide service within a limited geographical range and may not have system wide information. In order to enable D2D communication, a UE may use system information about D2D channels. Typically such system information is broadcast via an eNB as part of one or more System Information Blocks (SIBs). In addition, unicast RRC signaling between the eNB and the UE may be used. While a UE is associated with a HeNB, allocation of resources for D2D communication may be decided by the corresponding macro eNB. Where the UE is associated with a HeNB that is LTE Rel-11 or earlier, D2D resource allocation may not be communicated to the UE directly through the HeNB. As such, a method and apparatus for communicating D2D resource allocations to a UE supported by a HeNB is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with communicating D2D resource allocations to a UE supported by a HeNB. In one example, a network entity may be operable to determine whether a HeNB is operable to communicate system information to a UE. As used herein, system information may include, but is not limited to, D2D resource allocations, paging information, etc. When the network entity determines that a HeNB is operable to communicate system information to a UE, then it may transmit the system information to the HeNB to allow the HeNB to convey the system information to the UE. When the network entity determines that a HeNB is not operable to communicate system information to a UE, then it may transmit the system information to the UE via one or more other network entities.

According to related aspects, a method for communicating D2D resource allocations to a UE supported by a HeNB is provided. The method can include determining whether a HeNB is operable to communicate system information to a UE. In one aspect, the system information may include D2D resource allocations, paging information, etc. Further, the method may include transmitting the system information to the UE via a network entity upon a determination that the HeNB is not operable to communicate the system information. Moreover, the method may include transmitting the system information to the HeNB to allow the HeNB to convey the system information to the UE upon a determination that the HeNB is operable to communicate the system information.

Another aspect relates to a wireless communications apparatus. The wireless communications apparatus can include means determining whether a HeNB is operable to communicate system information to a UE. In one aspect, the system information may include D2D resource allocations, paging information, etc. Further, the wireless communications apparatus can include means for transmitting the system information to the UE via a network entity upon a determination that the HeNB is not operable to communicate the system information. Moreover, the wireless communications apparatus can include means for transmitting the system information to the HeNB to allow the HeNB to convey the system information to the UE upon a determination that the HeNB is operable to communicate the system information.

Another aspect relates to a wireless communications apparatus. The apparatus can include a processing system configured to determine whether a HeNB is operable to communicate system information to a UE. In one aspect, the system information may include D2D resource allocations, paging information, etc. Further, the processing system may be configured to transmit the system information to the UE via a network entity upon a determination that the HeNB is not operable to communicate the system information. Moreover, the processing system may be configured to transmit the system information to the HeNB to allow the HeNB to convey the system information to the UE upon a determination that the HeNB is operable to communicate the system information.

Another aspect relates to a computer program product, which can have a computer-readable medium comprising code for determining whether a HeNB is operable to communicate system information to a UE. In one aspect, the system information may include D2D resource allocations, paging information, etc. Further, the computer-readable medium can include code for transmitting the system information to the UE via a network entity upon a determination that the HeNB is not operable to communicate the system information. Moreover, the computer-readable medium can include code for transmitting the system information to the HeNB to allow the HeNB to convey the system information to the UE upon a determination that the HeNB is operable to communicate the system information.

According to another related aspect, a method for communicating D2D resource allocations to a UE supported by a HeNB is provided. The method can include receiving, by a HeNB, signaling indicating one or more resources allocated for D2D communications from a macro eNB. Moreover, the method can include transmitting the one or more resources allocated for D2D communications to one or more UEs associated with the HeNB.

Another aspect relates to a wireless communications apparatus. The wireless communications apparatus can include means for receiving, by a HeNB, signaling indicating one or more resources allocated for D2D communications from a macro eNB. Moreover, the wireless communications apparatus can include means for transmitting the one or more resources allocated for D2D communications to one or more UEs associated with the HeNB.

Another aspect relates to a wireless communications apparatus. The apparatus can include a processing system configured to receive signaling indicating one or more resources allocated for D2D communications from a macro eNB. Moreover, the processing system may be configured to transmit the one or more resources allocated for D2D communications to one or more UEs associated with the apparatus.

Another aspect relates to a computer program product, which can have a computer-readable medium comprising code for receiving, by a HeNB, signaling indicating one or more resources allocated for D2D communications from a macro eNB. Moreover, the computer-readable medium can include code for transmitting the one or more resources allocated for D2D communications to one or more UEs associated with the HeNB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
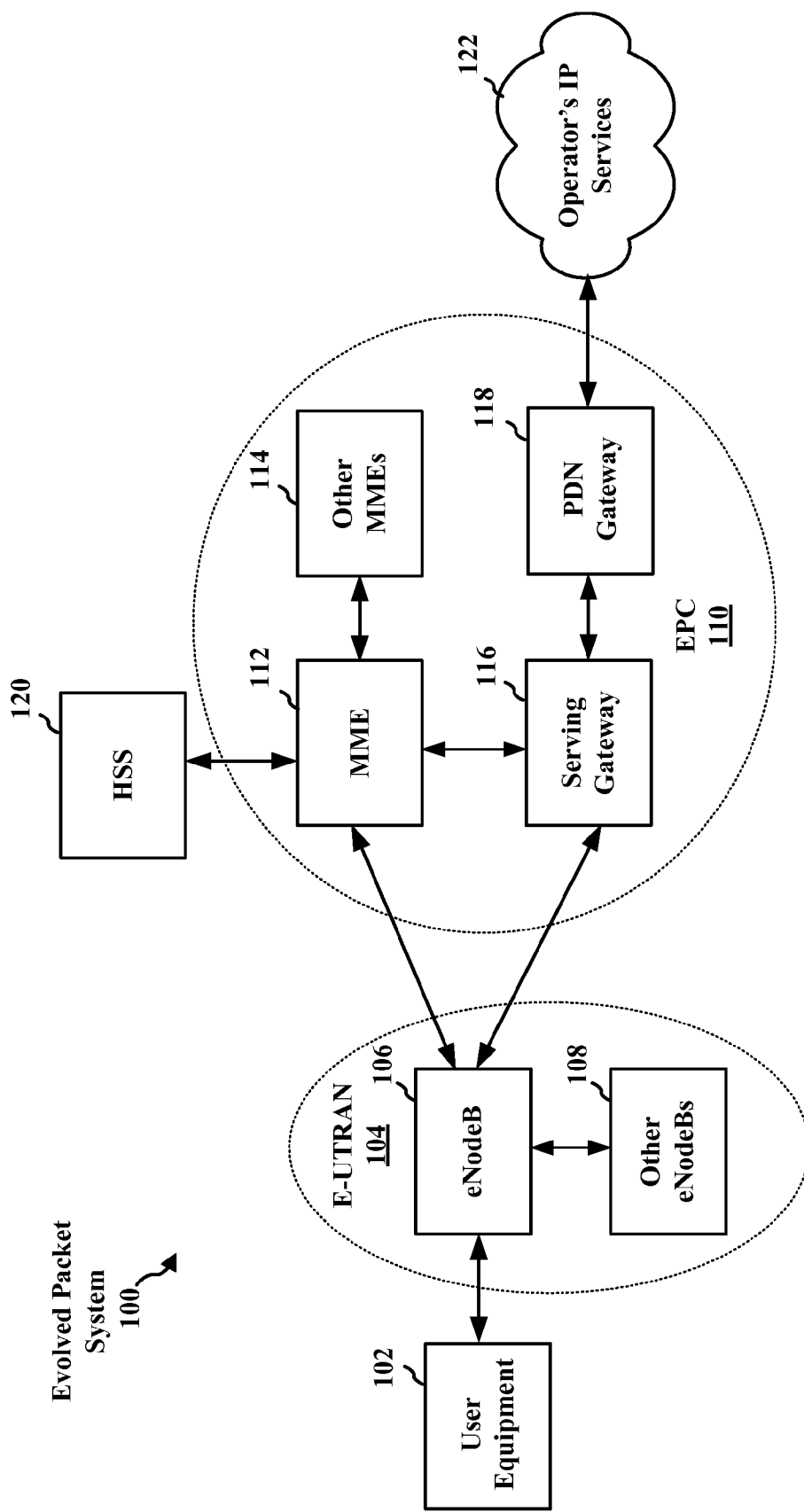
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
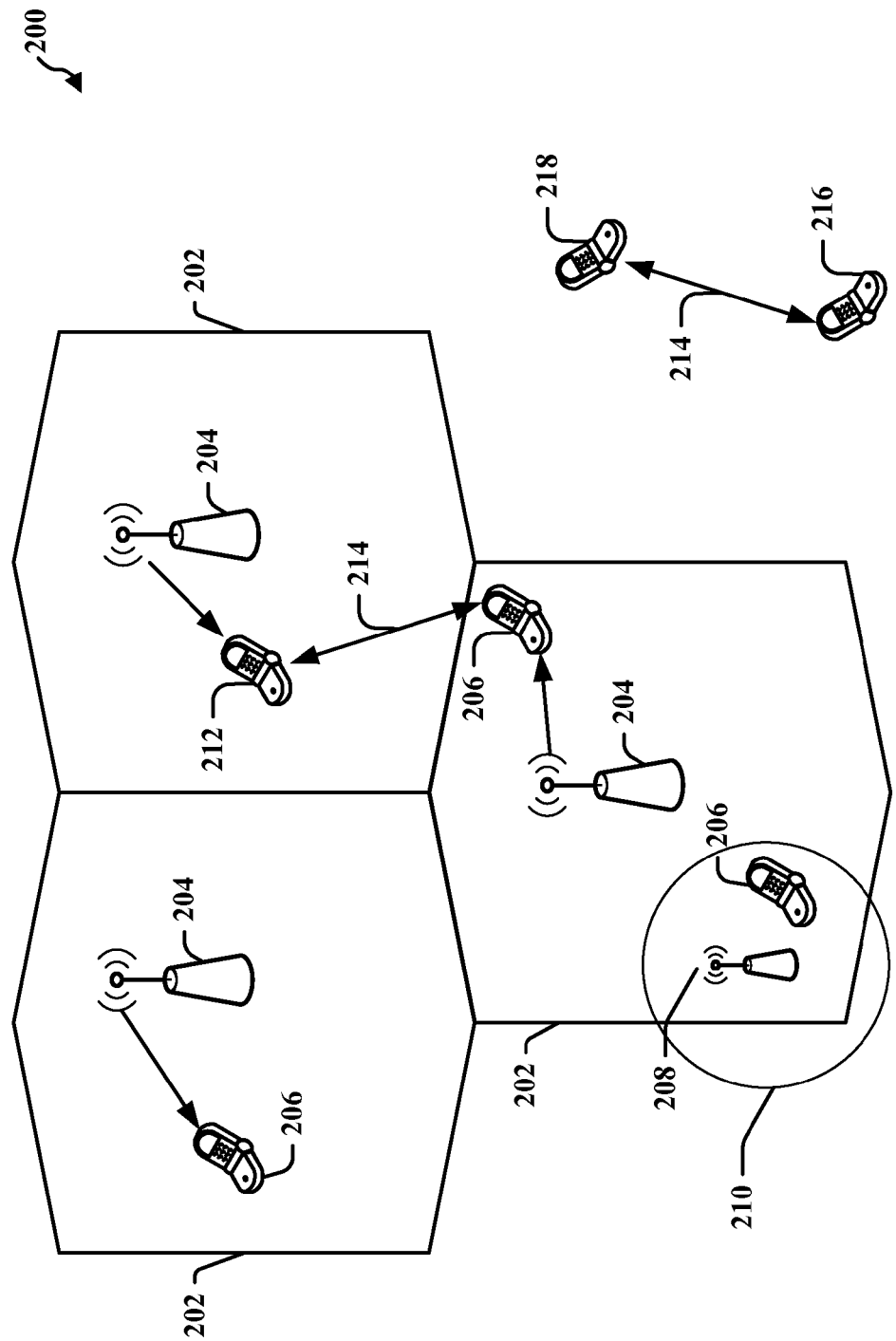
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

Further, some of the wireless devices 206, 212, 216, 218 may communicate together in peer-to-peer communication 214, some may communicate with the base station 204, and some may do both. For example, as shown in FIG. 2, the wireless devices 216, 218 may be in peer-to-peer communication 214 and the wireless devices 206, 212 may be in peer-to-peer communication 214. The wireless devices 206, 212 may also be in communication with the base station 204.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
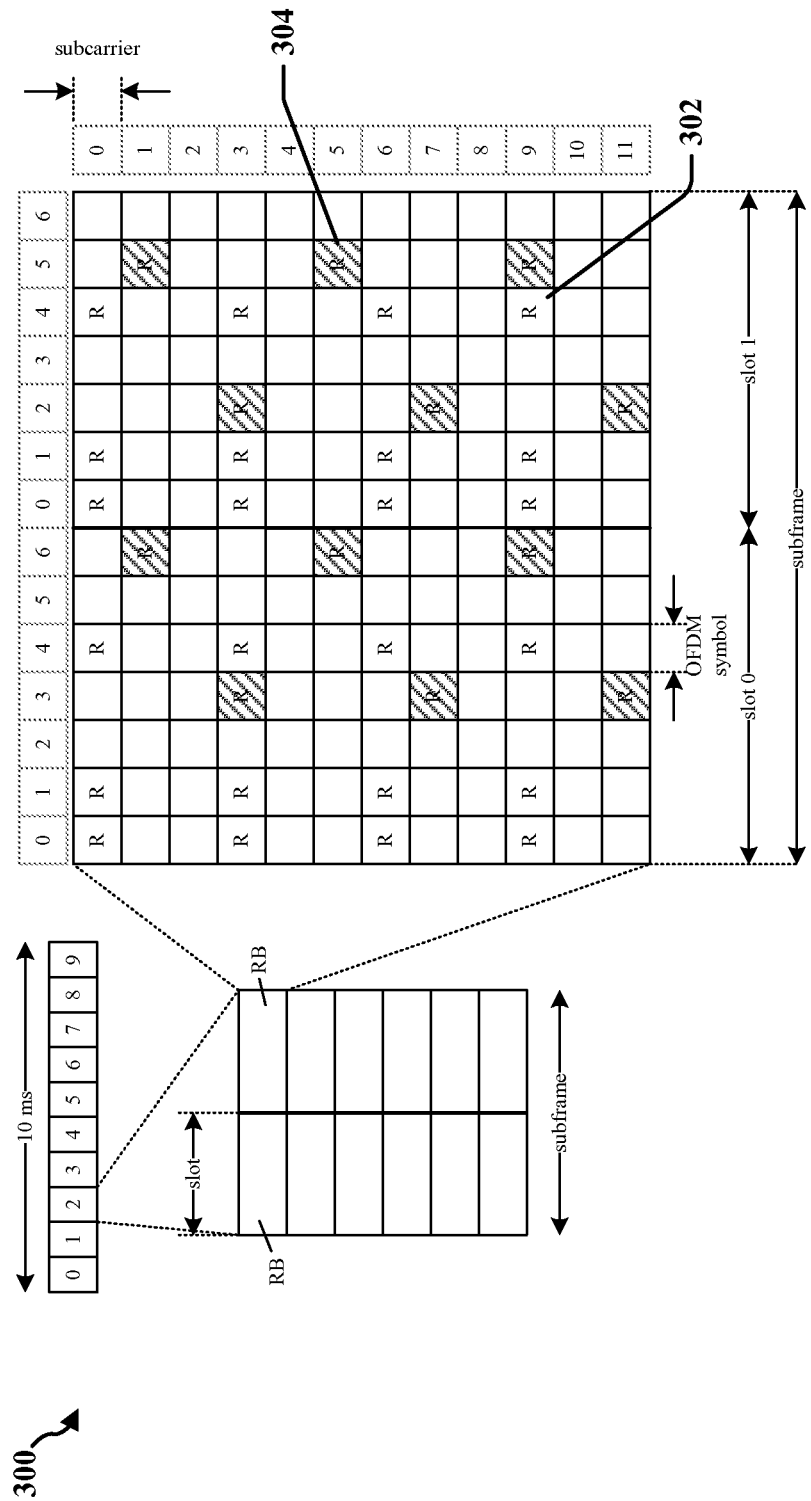
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
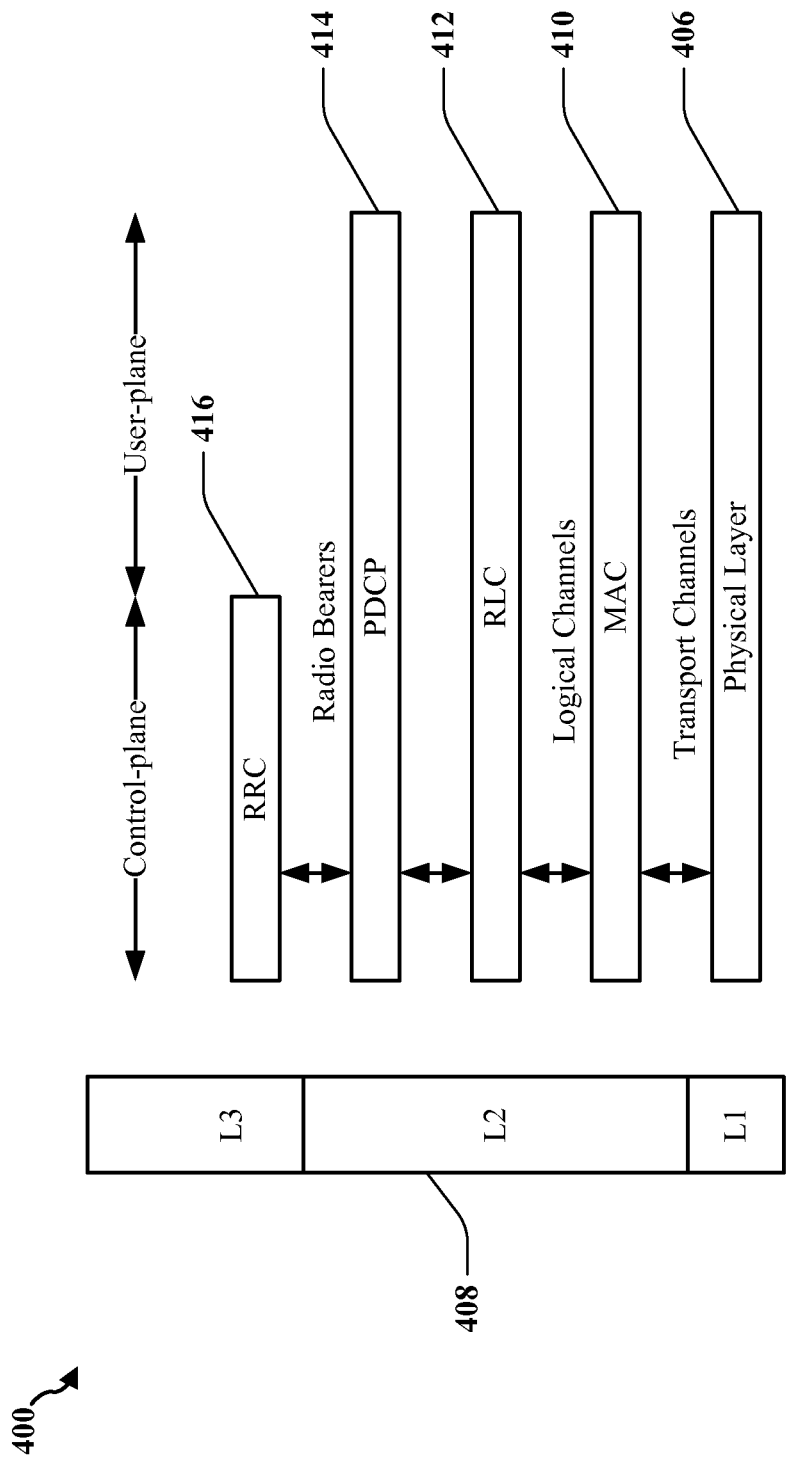
FIG. 4 is a diagram illustrating an example of a radio protocol architecture for the user and control planes.

FIG. 4 is a diagram 400 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 406. Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that is terminated at the PDN gateway 118 on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3 (L3 layer). The RRC sublayer 416 is responsible for obtaining radio resources (i.e., radio bearers) and for configuring the lower layers using RRC signaling between the eNB and the UE.

Figure 5:
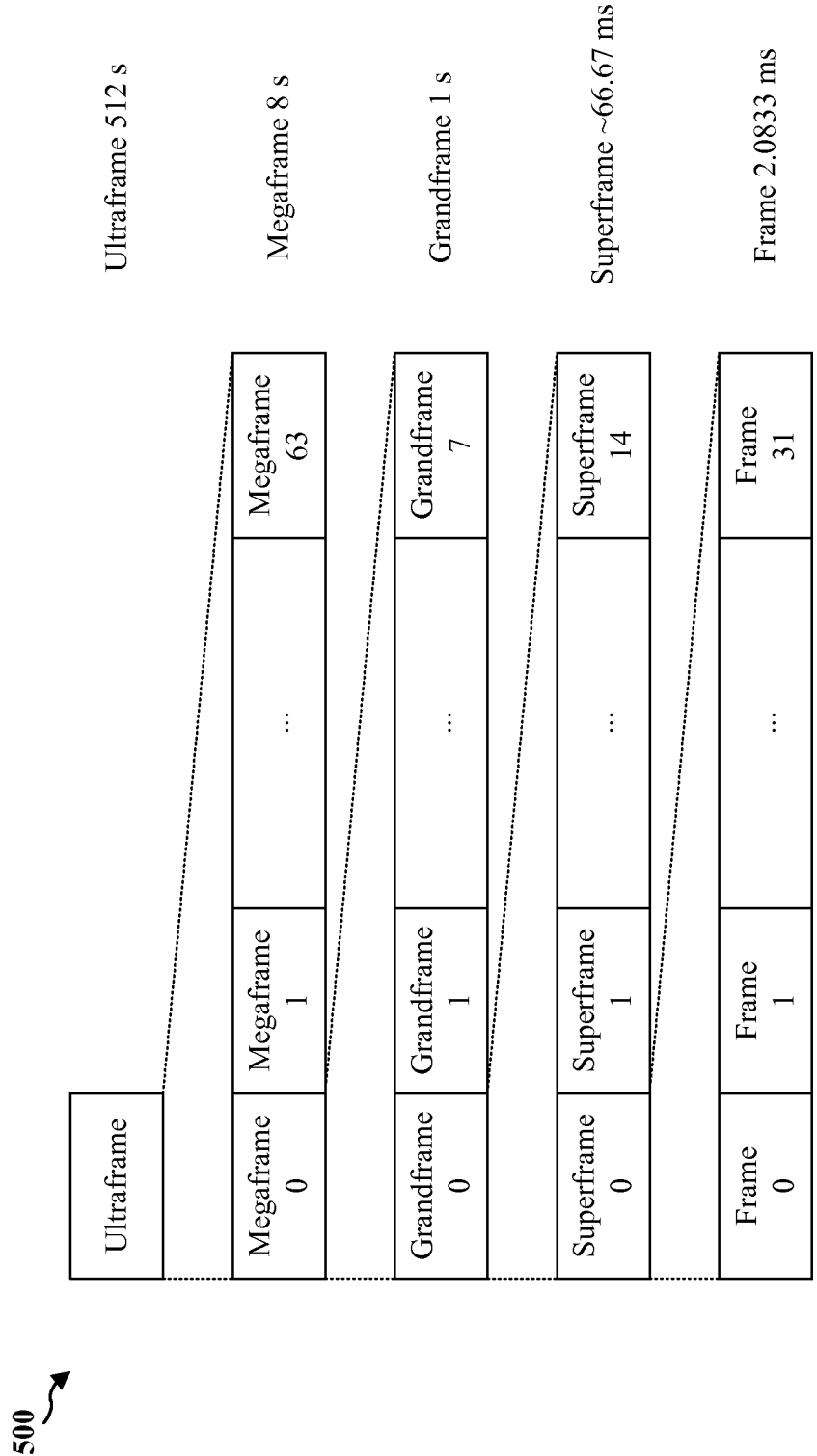
FIG. 5 is a diagram illustrating an exemplary time structure for peer-to-peer communication between the wireless devices.

FIG. 5 is a diagram 500 illustrating an exemplary time structure for peer-to-peer communication between the wireless devices. An ultraframe is 512 seconds and includes 64 megaframes. Each megaframe is eight seconds and includes eight grandframes. Each grandframe is one second and includes 15 superframes. Each superframe is approximately 66.67 ms and includes 32 frames. Each frame is 2.0833 ms.

Figure 6:
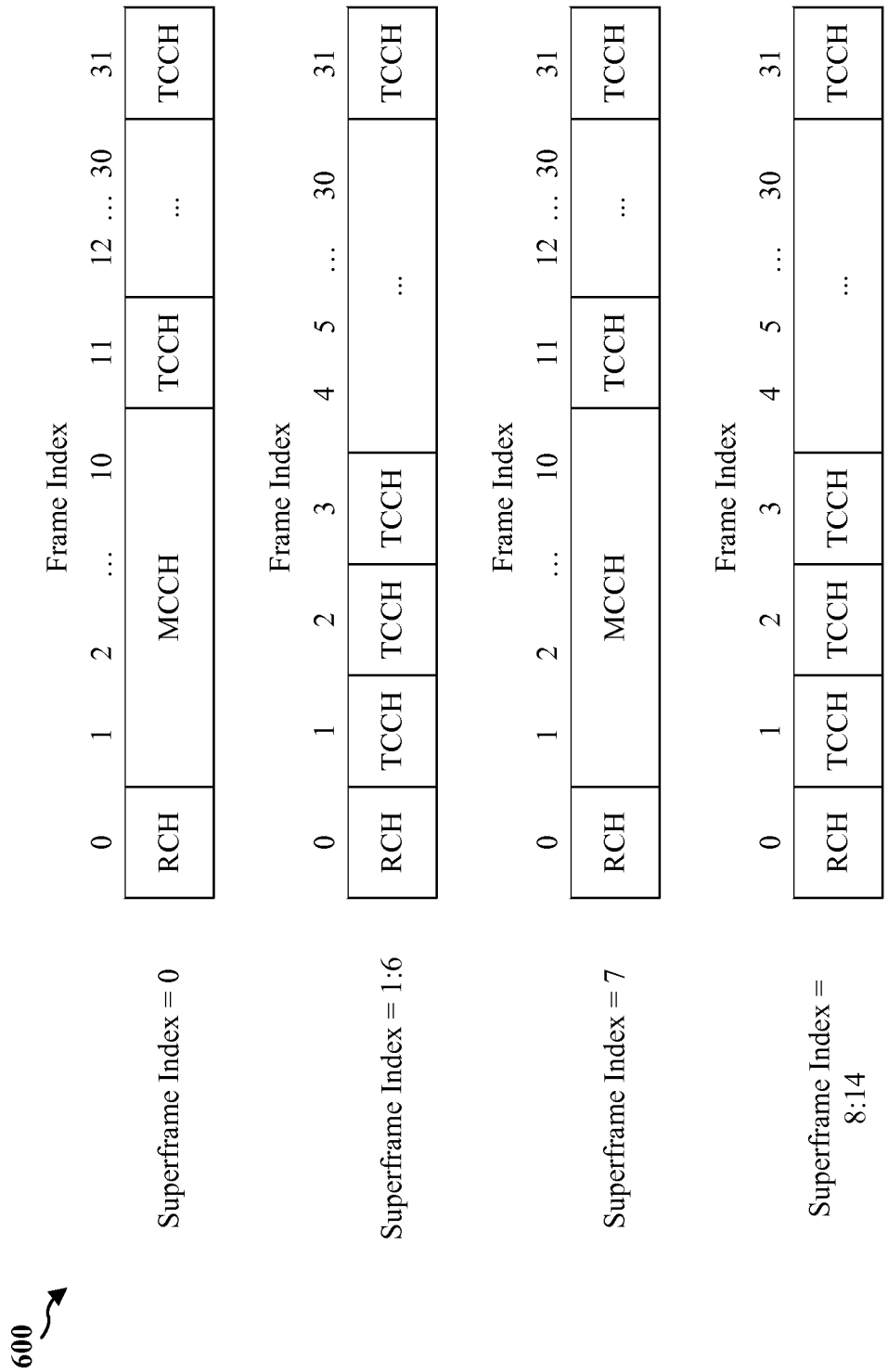
FIG. 6 is a diagram illustrating the channels in each frame of superframes in one grandframe.

FIG. 6 is a diagram 600 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the 2nd through 7th superframes (with index 1:6), frame 0 is a RCH and frames 1-31 are each a TCCH. In an 8th superframe (with index 7), frame 0 is a RCH, frames 1-10 are each a MCCH, and frames 11-31 are each a TCCH. In the 9th through 15th superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 7:
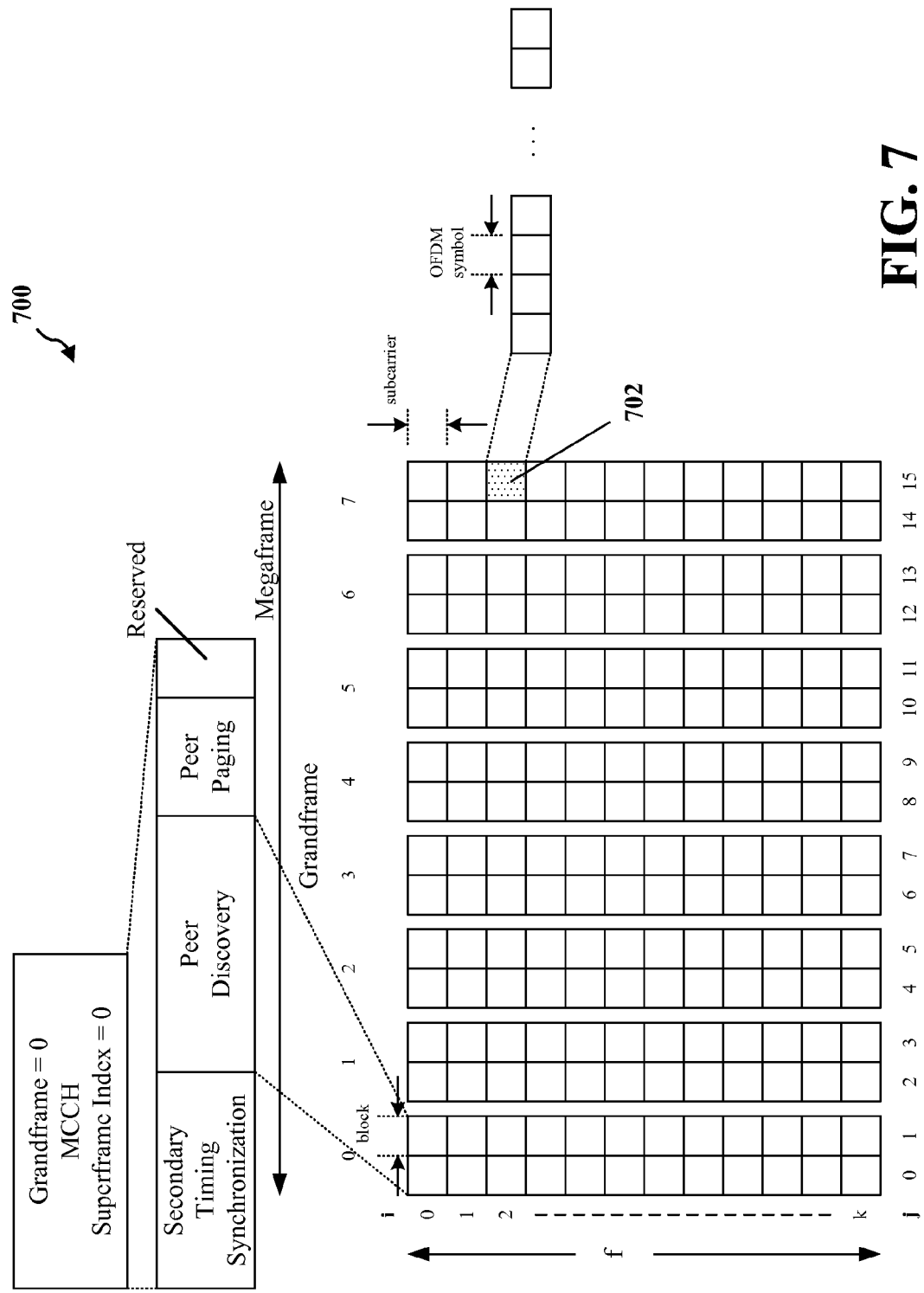
FIG. 7 is a diagram illustrating an operation timeline of a miscellaneous channel and a structure of a peer discovery channel.

FIG. 7 is a diagram 700 illustrating an operation timeline of the MCCH and an exemplary structure of a peer discovery channel. As discussed in relation to FIG. 6, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 7 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 702 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 8:
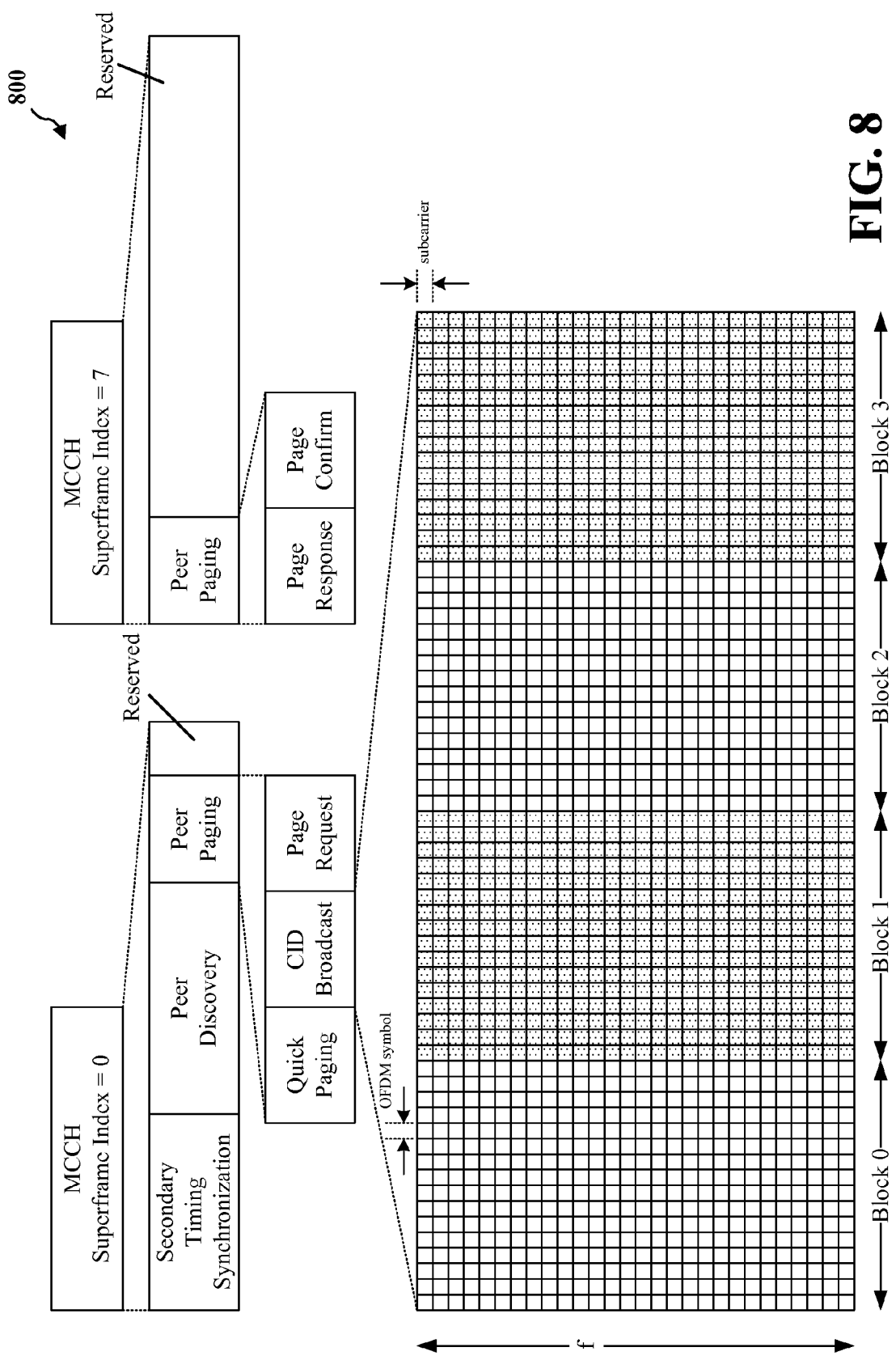
FIG. 8 is a diagram illustrating an operation timeline of a miscellaneous channel and a structure of a connection identifier broadcast.

FIG. 8 is a diagram 800 illustrating an operation timeline of the MCCH and a structure of a connection identifier (CID) broadcast. As discussed in relation to FIG. 6, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 9:
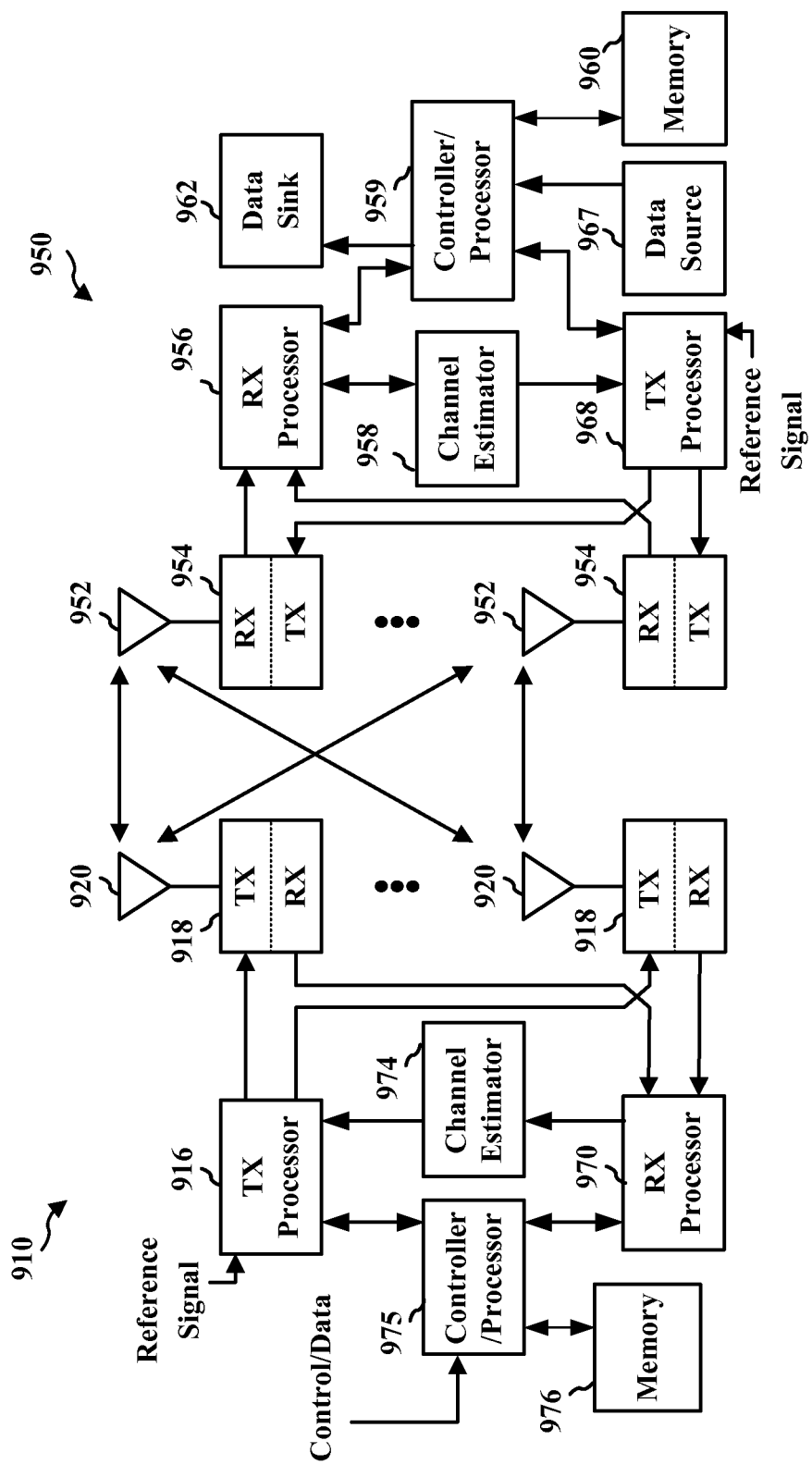
FIG. 9 is a diagram illustrating an example of an evolved Node B and user equipment in an access network.

FIG. 9 is a block diagram of an eNB 910 in communication with a UE 950 in an access network. In the DL, upper layer packets from the core network are provided to a controller/processor 975. The controller/processor 975 implements the functionality of the L2 layer. In the DL, the controller/processor 975 provides header compression, ciphering, packet segmentation and reordering, multiplexing between logical and transport channels, and radio resource allocations to the UE 950 based on various priority metrics. The controller/processor 975 is also responsible for HARQ operations, retransmission of lost packets, and signaling to the UE 950.

The transmit (TX) processor 916 implements various signal processing functions for the L1 layer (i.e., physical layer). The signal processing functions includes coding and interleaving to facilitate forward error correction (FEC) at the UE 950 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream is then provided to a different antenna 920 via a separate transmitter 918TX. Each transmitter 918TX modulates an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The RX processor 956 implements various signal processing functions of the L1 layer. The RX processor 956 performs spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 910. These soft decisions may be based on channel estimates computed by the channel estimator 958. The soft decisions are then decoded and deinterleaved to recover the data and control signals that were originally transmitted by the eNB 910 on the physical channel. The data and control signals are then provided to the controller/processor 959.

The controller/processor 959 implements the L2 layer. The controller/processor can be associated with a memory 960 that stores program codes and data. The memory 960 may be referred to as a computer-readable medium. In the UL, the control/processor 959 provides demultiplexing between transport and logical channels, packet reassembly, deciphering, header decompression, control signal processing to recover upper layer packets from the core network. The upper layer packets are then provided to a data sink 962, which represents all the protocol layers above the L2 layer. Various control signals may also be provided to the data sink 962 for L3 processing. The controller/processor 959 is also responsible for error detection using an acknowledgement (ACK) and/or negative acknowledgement (NACK) protocol to support HARQ operations.

In the UL, a data source 967 is used to provide upper layer packets to the controller/processor 959. The data source 967 represents all protocol layers above the L2 layer. Similar to the functionality described in connection with the DL transmission by the eNB 910, the controller/processor 959 implements the L2 layer for the user plane and the control plane by providing header compression, ciphering, packet segmentation and reordering, and multiplexing between logical and transport channels based on radio resource allocations by the eNB 910. The controller/processor 959 is also responsible for HARQ operations, retransmission of lost packets, and signaling to the eNB 910.

Channel estimates derived by a channel estimator 958 from a reference signal or feedback transmitted by the eNB 910 may be used by the TX processor 968 to select the appropriate coding and modulation schemes, and to facilitate spatial processing. The spatial streams generated by the TX processor 968 are provided to different antenna 952 via separate transmitters 954TX. Each transmitter 954TX modulates an RF carrier with a respective spatial stream for transmission.

The UL transmission is processed at the eNB 910 in a manner similar to that described in connection with the receiver function at the UE 950. Each receiver 918RX receives a signal through its respective antenna 920. Each receiver 918RX recovers information modulated onto an RF carrier and provides the information to a RX processor 970. The RX processor 970 may implement the L1 layer.

The controller/processor 975 implements the L2 layer. The controller/processor 975 can be associated with a memory 976 that stores program codes and data. The memory 976 may be referred to as a computer-readable medium. In the UL, the control/processor 975 provides demultiplexing between transport and logical channels, packet reassembly, deciphering, header decompression, control signal processing to recover upper layer packets from the UE 950. Upper layer packets from the controller/processor 975 may be provided to the core network. The controller/processor 975 is also responsible for error detection using an ACK and/or NACK protocol to support HARQ operations.

Figure 10:
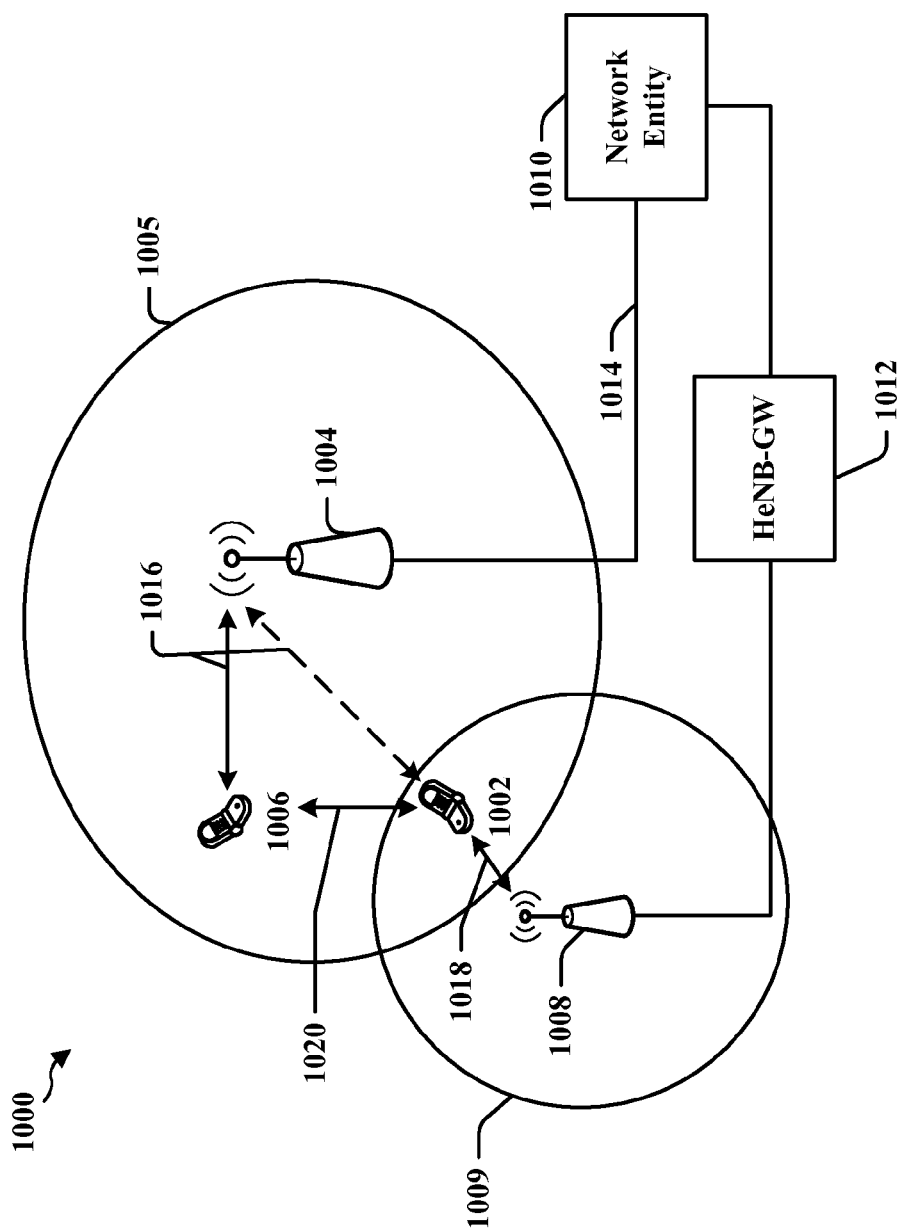
FIG. 10 is a diagram illustrating an example of an access network in which D2D communications may be performed according to an aspect.

FIG. 10 is a diagram 1000 illustrating a wireless communications environment operable to support cellular communications and peer to peer communications.

A wireless communications network 1000 may include a plurality UEs (1002, 1006), and a plurality of eNBs (1004, 1008). The UEs (1002, 1006) may be associated with difference eNBs (1004, 1008) and the eNBs (1004, 1008) may provide coverage for different regions (1005, 1009). Further, the different eNBs (1004, 1008) may be operable as different power class eNBs. In the depicted aspect, eNB 1008 may be a HeNB while eNB 1004 may be a macro eNB. As used herein, a macro eNB 1004 may be operable to provide service within a large geographical region 1005 and may receive and communicate system wide information. A HeNB 1008 may be operable to provide service within a limited geographical range 1009 and may not have access system wide information. Further, in the depicted aspect, UE(1) 1002 is associated with HeNB 1008 within a first coverage region 1009 and UE(2) 1006 may be associated with a macro eNB 1004 in a second coverage region 1005. In one aspect, coverage region 1005 and coverage region 1009 may overlap, thereby allowing UEs (e.g., 1002, 1006) to receive service from at least one of and/or both eNBs (1004, 1008). Further, UEs (1002, 1006) may be operable to communicate directly with each other using resources 10202 allocated for device to device (D2D) communications. For D2D communication to be enabled, a device, say UE(1) 1002, may use system information including a set of resources allocated for communications with another device, say UE(2) 1006. In one aspect, communications system 1000 may include one or more network entities 1010 that are operable to determine which resources to allocate for D2D communications. In one aspect, network entity 1010 may include a MME, another macro eNB, etc. Network entity 1010 may communication with macro eNB using an S1 or X1 interface 1014. In one aspect, network entity 1010 may received the D2D resource allocation information from another macro eNB (not shown).

In operation, for communications system 100 to effectively allow UEs to perform direct D2D communications 1020, each UE (1002, 1006) needs to be aware which resources have been allocated for the D2D communications 1020. For a UE (e.g., UE 1006) that is supported by macro eNB 1004, the D2D resource allocation may be communicated 1016 in a system information block (SIB) using any multi-access technology (e.g., LTE). In one aspect, a UE (e.g., UE 1002) may be supported by a HeNB 1008.

In one operational aspect, HeNB 1008 may be operable to obtain system information from network entity 1010, through a HeNB gateway 1012 (HeNB-GW), and communicate 1018 the system information to a UE 1002. In such an aspect, the HeNB 1008 may be an LTE Rel-12 compatible HeNB.

In another operational aspect, a HeNB 1008 may not be configured to receive system information associated with D2D communications. In such an aspect, the HeNB 1008 may be an LTE Rel-11 or earlier compatible HeNB. Where the UE 1002 is with coverage region 1005 of macro eNB 1004, the system information may be communicated to the UE 1002 via the macro eNB 1004. In one aspect, the macro eNB may use an almost blank subframe (ABS) of the HeNB 1008 so as to minimize potential interference. In one aspect, the macro ENB 1004 may use RRC signaling to communicate the system information to the UE 1002. Where the UE 1002 is not in communication with macro eNB 1004, the system information may be provided to the UE 1002 via HeNB-GW 1012 and the HeNB 1008. In such an aspect, the system information may be included in an internet protocol (IP) packet that may be generated by a network entity 1010.

Network entity 1010 may be operable to determine whether HeNB 1008 is operable to communicate system information to a UE, and based upon that determination may either transmit the system information to the UE via a network entity, or transmit the system information to the HeNB to allow the HeNB to convey the system information to the UE.

Figure 11:
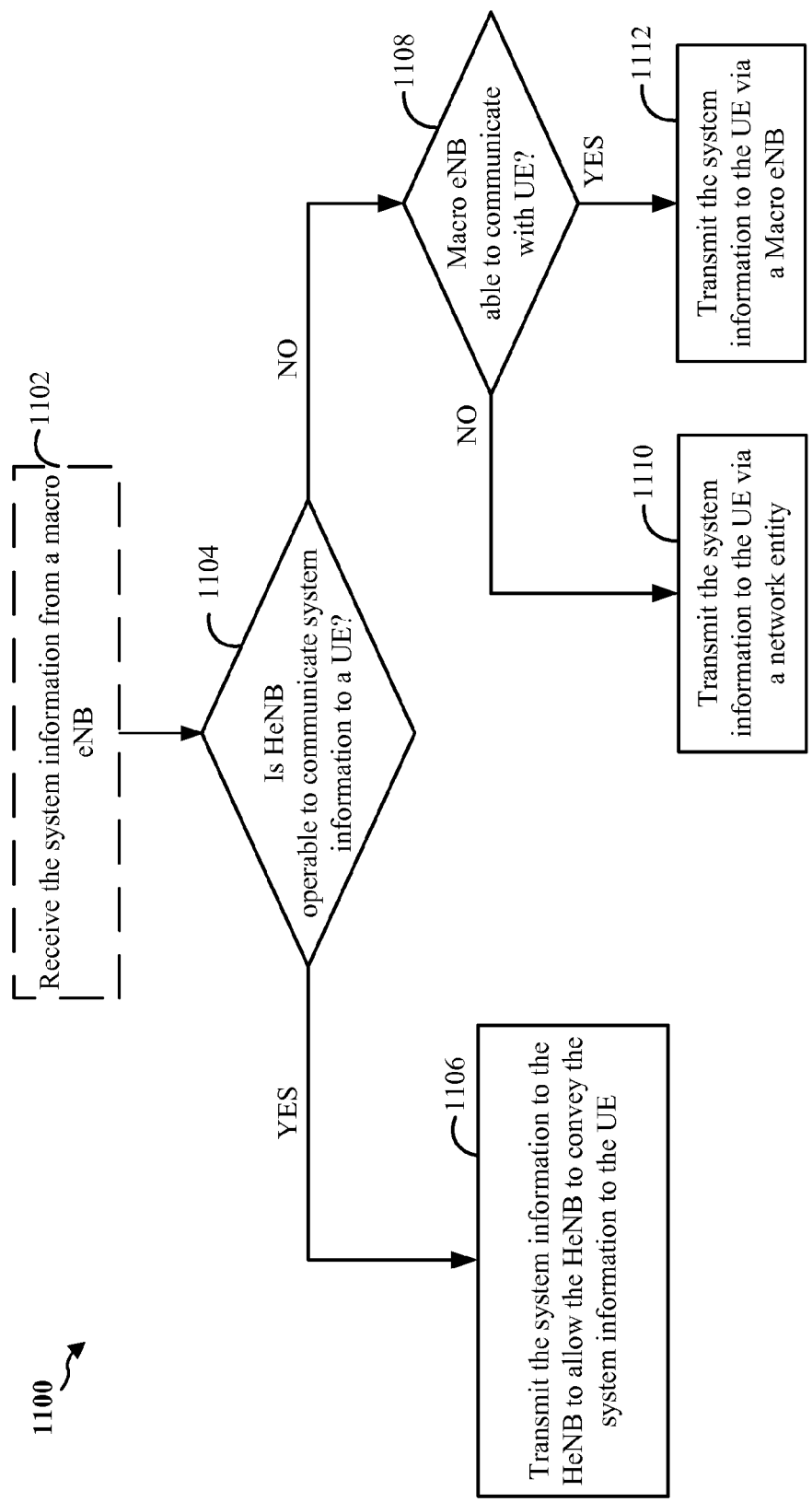
FIG. 11 is a flow chart of a method of wireless communication.
Figure 14:
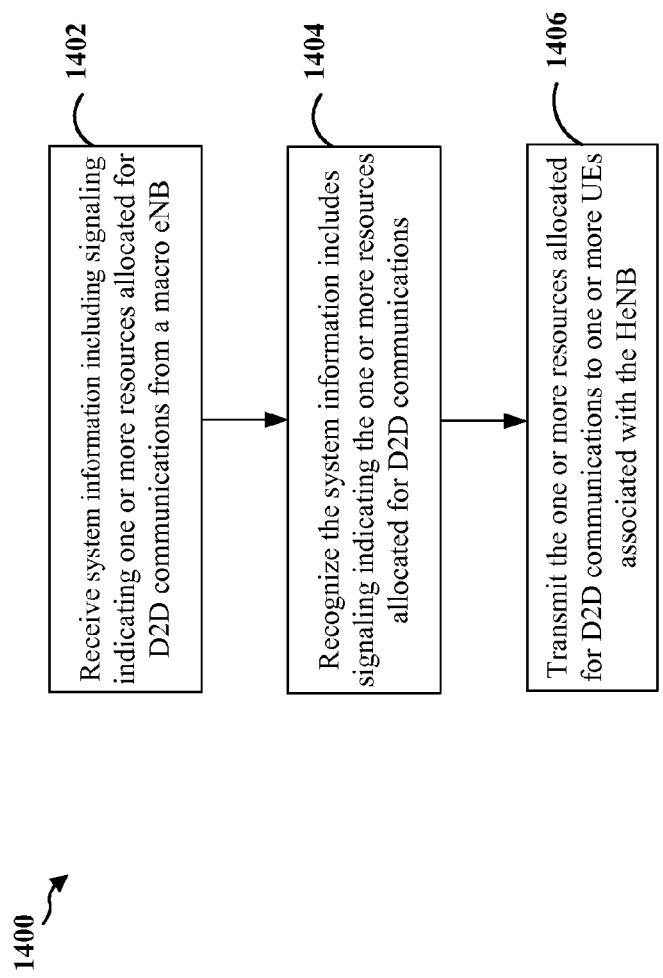
FIG. 14 is a flow chart of a method of wireless communication.

FIGS. 11 and 14 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 11 is a flow chart 1100 of a method of wireless communication. The method may be performed by a wireless device.

Optionally, at block 1102, a network entity may receive system information may receive from a macro eNB. In one aspect, the system information may include D2D resource allocations, paging information, etc., for a UE.

At block 1104, the network entity may determine whether a HeNB serving a UE is operable to communication the system information to the UE. In one aspect, a HeNB that is LTE Rel-11 or earlier does not support D2D communications, while a LTE Rel-12 HeNB supports D2D communications. In one aspect, the network entity that performs the determination may be a macro eNB, MME, or another network entity.

If at block 1104, if it determined that the HeNB may communicate the system information, then at block 1106, the system information may be transmitted to the HeNB to allow the HeNB to transmit the system information to the UE. The resources allocated for D2D transmission can be signaled to the HeNB over the X2 or S1 interfaces. The D2D resource allocations may then provided by the HeNB to the associated UEs via RRC signaling. Additionally, in one aspect, system information may further include quality of service (QoS) policies, policies on using D2D or wide area network (WAN) resources, etc.

By contrast, if at block 1104, the network entity determines that the HeNB is not operable to communicate the system information to the UE, then at block 1108 the network entity may further determine whether the UE is within range to communicate with a macro eNB. In one aspect, block 1108 may be performed irrespective of the HeNB operability.

If at block 1108, the network entity determines that the UE is not within range and/or is unable to communicate with a Macro eNB, then at block 1110 system information may be provided to the UE by generating an IP packet and tunneling the information to the UE. In one aspect, a macro eNB can transmit the system information to a MME, which can then include the information in an IP packet and transmit the IP packet to the UE. In one aspect, the IP packet may be communicated from the MME to a (HeNB-GW), then to the HeNB and then to the UE.

By contrast, if at block 1108, the UE is within range of a macro eNB, then at block 1112, the macro eNB may communicate the system information to the UE. In one aspect, a UE discontinuous reception (DRX) can be configured such that the UE can decode the MIBs and SIBs from a macro eNB if the UE is in the coverage area of the eNB. This can be possible if the HeNBs are synchronized with the macro eNB. Such synchronization may allow the macro eNB to communication during almost-blank-subframes (ABS) of the HeNB. Then the UE can directly the system information relevant to D2D communication from the macro eNB.

Figure 12:
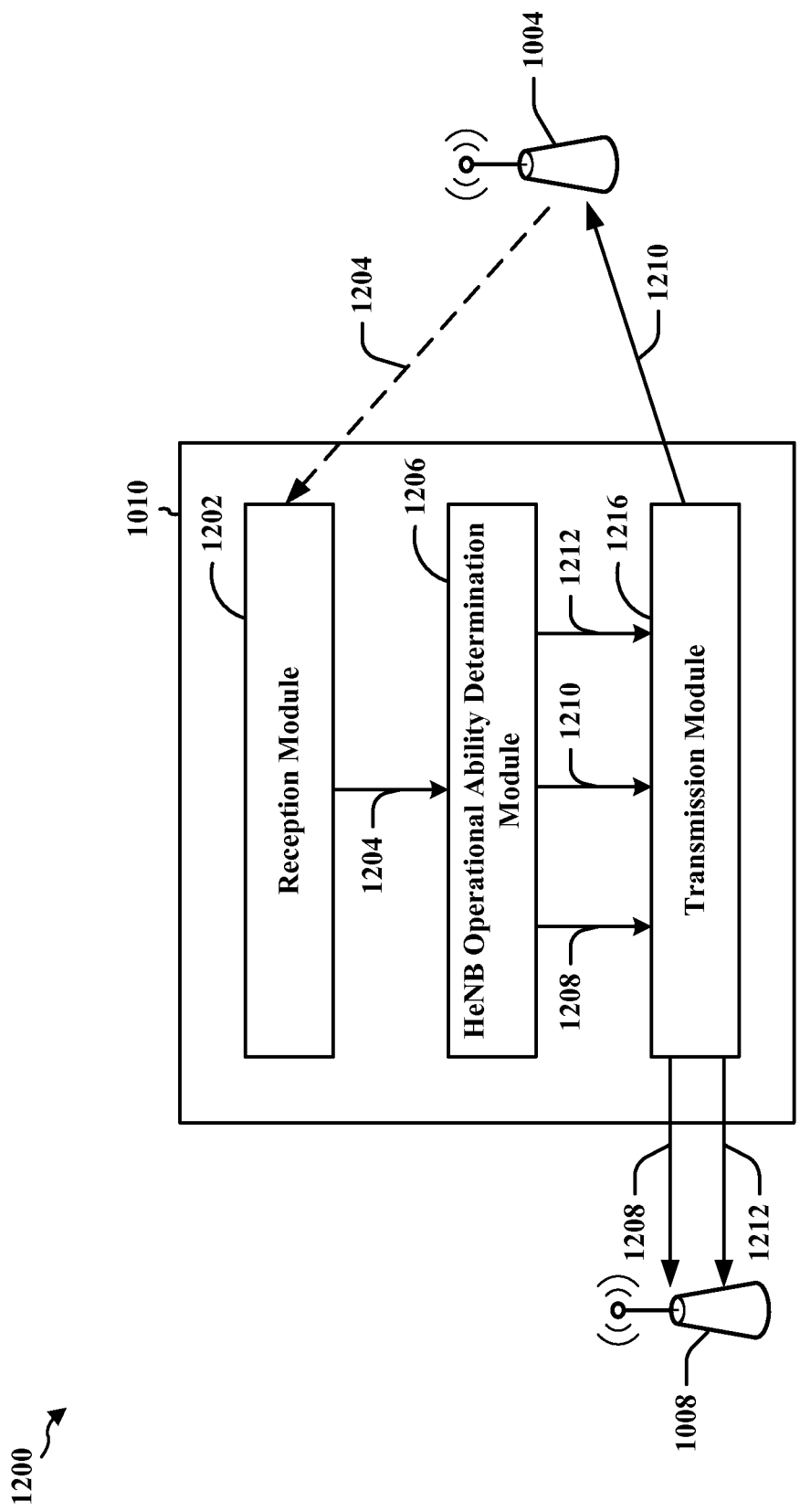
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1010. In an optional aspect, the apparatus 1010 includes a reception module 1202 that may receive system information 1204, from a macro eNB 1004, indicating at least one of resources allocated for D2D communications, paging information, etc. Further, reception module 1202 may communicate the system information 1204 to HeNB operational ability determination module 1206.

Apparatus 1010 further includes HeNB operational ability determination module 1206 that may be operable to determine whether a HeNB is operable to communicate system information to a UE. In one aspect, a HeNB that is LTE Rel-11 or earlier does not support D2D communications, while a LTE Rel-12 HeNB supports D2D communications. In one aspect, HeNB operational ability determination module 1206 may determine that the HeNB is operable to communicate system information 1204 to a UE. In such an aspect, HeNB operational ability determination module 1206 may provide the system information in a format 1208 that allows the HeNB to communicate the system information to a UE. In one aspect, the system information is formatted 1208 to allow the HeNB to communicate the system information using RRC signaling. In another aspect, HeNB operational ability determination module 1206 may determine that the HeNB is not operable to communicate system information 1204 to a UE. In such an aspect, where the UE is within range of a macro eNB 1004, HeNB operational ability determination module 1206 may provide the system information in a format 1210 that allows the macro eNB to communicate system information to the UE. In another aspect, where HeNB operational ability determination module 1206 determines that the HeNB is not operable to communicate system information 1204 to a UE, and the UE may not communicate with a macro eNB, HeNB operational ability determination module 1206 may provide the system information in a format 1212 that may be tunneled to the UE through the HeNB using an IP packet.

Apparatus further includes transmission module 1214 that is operable to system information in a manner that will allow a UE to receive the system information. In one aspect, transmission module 1214 may transmit system information formatted 1208 to allow a HeNB 1008 to communicate the UE. In another aspect, transmission module may communicate system information formatted 1210 to be communicated by a macro eNB. In such an aspect, a DRX can be configured such that the UE can decode the MIBs and SIBs from a macro eNB 1004. In another aspect, transmission module 1214 may transmit system information formatted 1212 as an IP packet to HeNB 1008 via a HeNB-GW (Not shown).

The apparatus may include additional modules that perform each of the steps of the algorithm in the aforementioned flow chart FIG. 11. As such, each step in the aforementioned flow chart FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
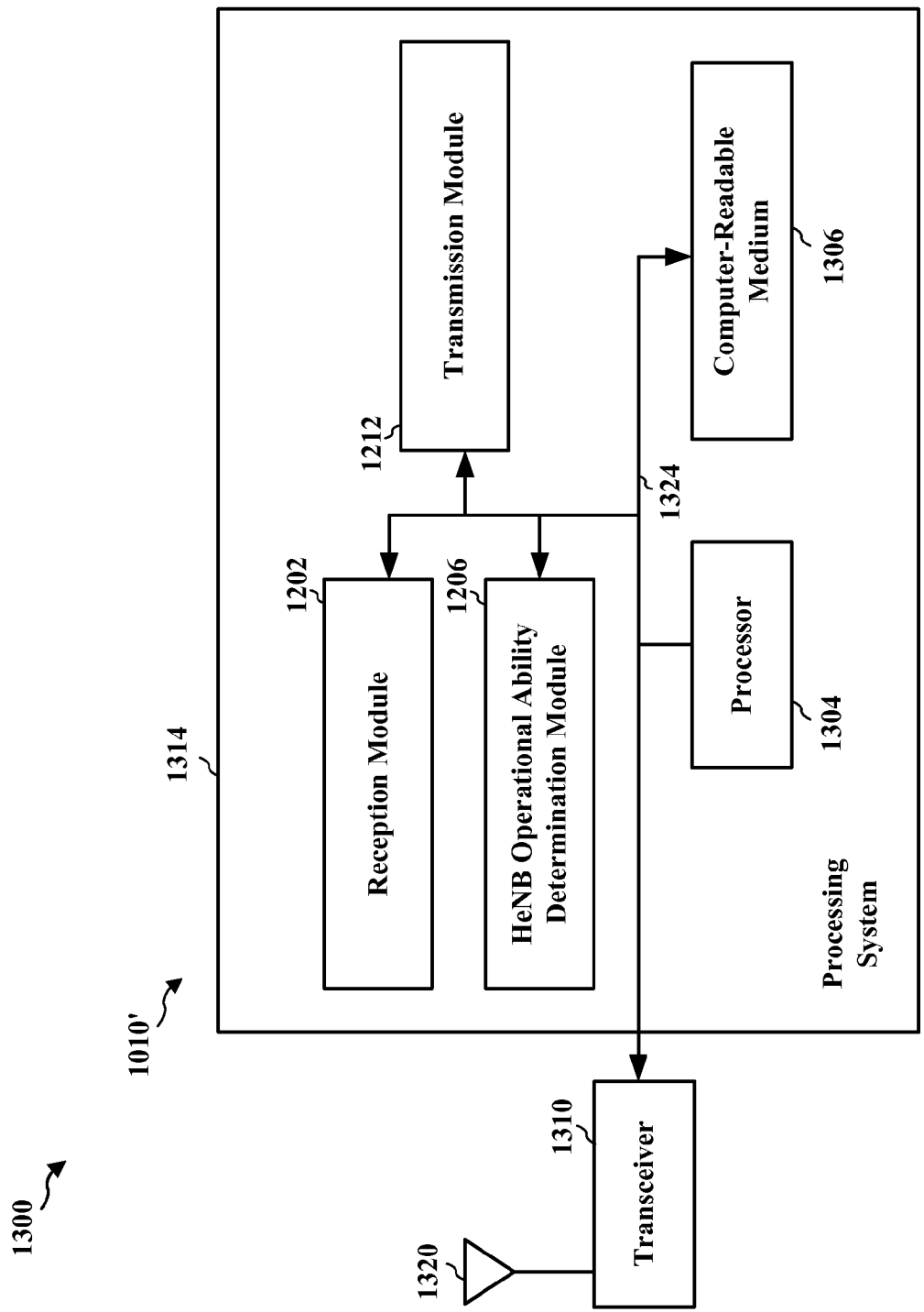
FIG. 13 is a diagram illustrating an example of a hardware implementation for an apparatus employing a processing system.

FIG. 13 is a diagram illustrating an example of a hardware implementation for an apparatus 1010' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1202, 1206, 1216, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1202, 1306, and 1316. The modules may be software modules running in the processor 1304, resident/stored in the computer readable medium 1306, one or more hardware modules coupled to the processor 1304, or some combination thereof.

In one configuration, the apparatus 1010/1010' for wireless communication includes means for determining whether a HeNB is operable to communicate system information to a UE, means for transmitting the system information to the UE via a network entity upon a determination that the HeNB is not operable to communicate the system information, or means for transmitting the system information to the HeNB to allow the HeNB to convey the system information to the UE upon a determination that the HeNB is operable to communicate the system information. In one aspect, the system information may include at least one of D2D resource allocations or paging information. The apparatus 1010/1010' for wireless communication may further include means for signaling using either an X2 or S1 interface. The apparatus 1010/1010' for wireless communication may further include means for transmitting the system information to the UE via a network entity during an ABS of the HeNB. The apparatus 1010/1010' for wireless communication may further include means for transmitting an IP packet including the system information to the UE. In such an aspect, the apparatus 1010/1010' for wireless communication may further include means for receiving the system information from a macro eNB.

The aforementioned means may be one or more of the aforementioned modules of the apparatus 1010 and/or the processing system 1314 of the apparatus 1010' configured to perform the functions recited by the aforementioned means.

FIG. 14 is a flow chart 1400 of a method of wireless communication. The method may be performed by a HeNB.

At block 1402, the HeNB may receive system information including signaling indicating one or more resources allocated for D2D communications. In one aspect, the signaling may be received from a macro eNB. In such an aspect, the macro eNB may communicate the signaling indicating the one or more resources allocated for D2D communications using an X2 or S1 interface.

At block 1404, the HeNB may recognize the received system information includes signaling indicating the one or more resources allocated for D2D communications. In one aspect, a HeNB that is compatible with LTE Rel-12 may be able to recognize D2D resource allocations.

At block 1406, the HeNB may transmit the one or more resources allocated for D2D communications to one or more UEs associated with the HeNB. In one aspect, the HeNB may transmit the one or more resource allocated for D2D communications using RRC signaling.

Figure 15:
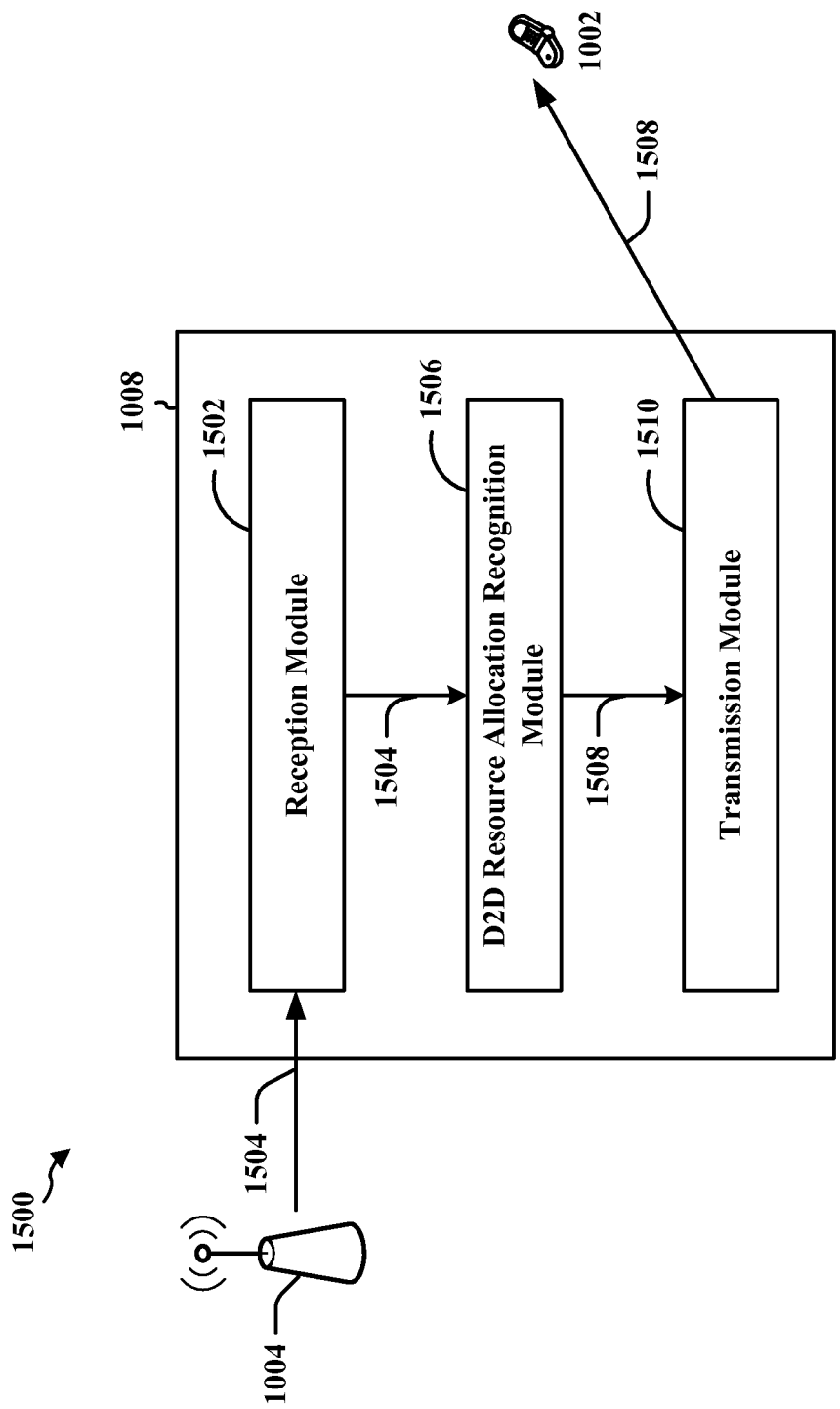
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1008. The apparatus 1008 includes a reception module 1502 that is operable to receive system information 1504 including one or more resources allocated for D2D communications. In one aspect, the system information 1504 may be received from a macro eNB 1004. In such an aspect, the communications between the macro eNB 1004 and the HeNB 1008 may be facilitated using at least one of an X2 or S1 interface.

The apparatus 1008 further includes D2D resource allocation recognition module 1506 that is operable to process the received system information 1504 and recognize the one or more resources allocated for D2D communications 1508.

The apparatus may further include a transmission module 1510. In one aspect, transmission module 1510 may transmit the one or more resources allocated for D2D communications 1508 to one or more UEs 1002 supported by the HeNB 1008. In one aspect, transmission module 1510 may be operable to use RCC signaling to communicate the one or more resources allocated for D2D communications.

The apparatus may include additional modules that perform each of the steps of the algorithm in the aforementioned flow chart FIG. 13. As such, each step in the aforementioned flow chart FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
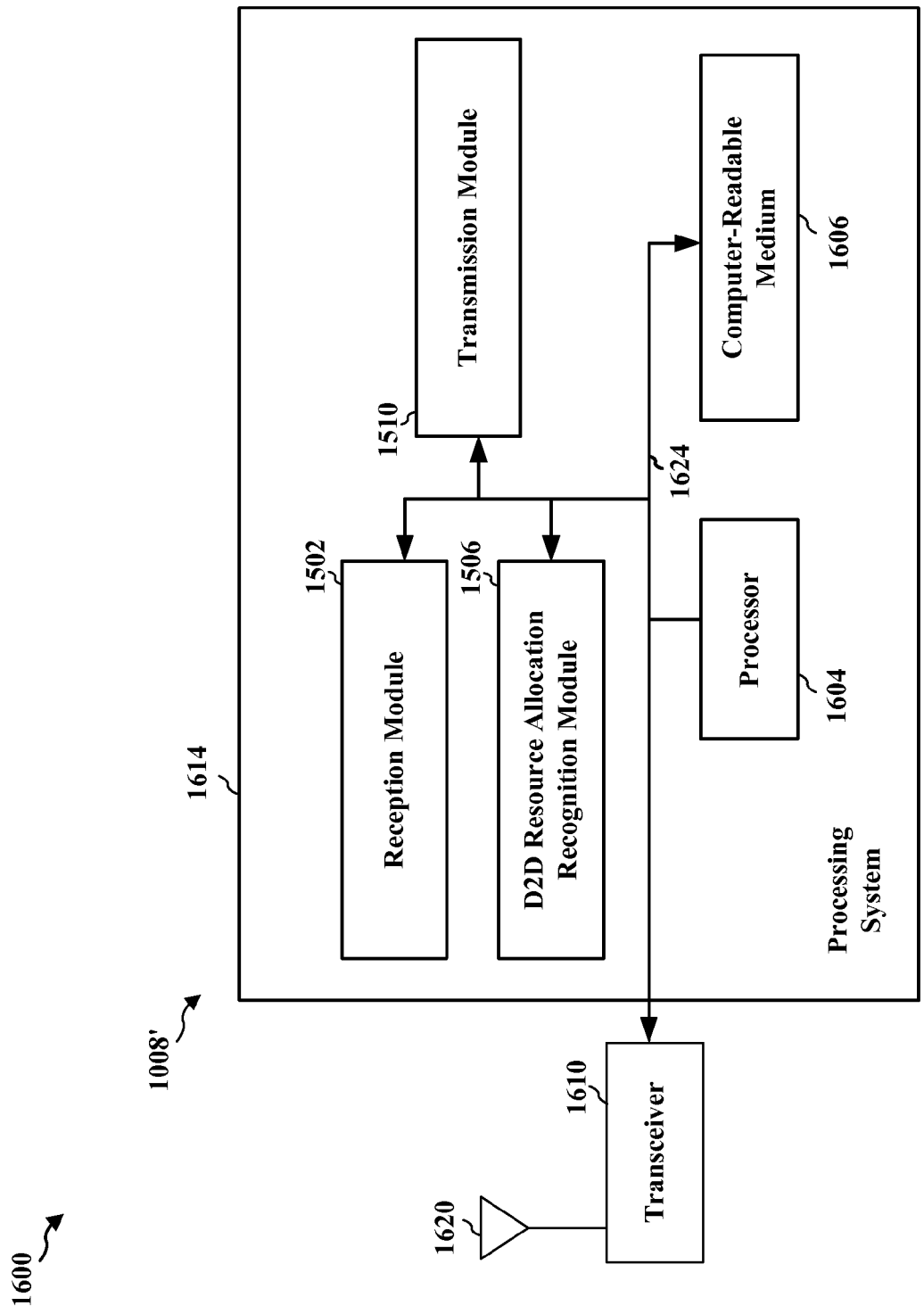
FIG. 16 is a diagram illustrating an example of a hardware implementation for an apparatus employing a processing system.

FIG. 16 is a diagram illustrating an example of a hardware implementation for an apparatus 1008' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1502, 1506, 1510, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1502, 1506, and 1510. The modules may be software modules running in the processor 1604, resident/stored in the computer readable medium 1606, one or more hardware modules coupled to the processor 1604, or some combination thereof.

In one configuration, the apparatus 1008/1008' for wireless communication includes means for receiving, by a HeNB, system information including signaling indicating one or more resources allocated for D2D communications from a macro eNB, means for recognizing that the system information includes the signaling indicating the one or more resources allocated for D2D communications, and means for transmitting the one or more resources allocated for D2D communications to one or more UEs associated with the HeNB. In one aspect, apparatus 1008/1008' may include means for receiving the signaling using either an X2 or S1 interface. In one aspect, apparatus 1008/1008' may include means for transmitting to the one or more UEs using RRC signaling.

The aforementioned means may be one or more of the aforementioned modules of the apparatus 1008 and/or the processing system 1614 of the apparatus 1008' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
   determining whether a home evolved NodeB (HeNB) supports device to device (D2D) communications such that the HeNB is operable to communicate system information to a user equipment (UE), wherein the system information includes D2D resource allocations;
   transmitting the system information to the UE via a network entity upon a determination that the HeNB does not support D2D communications such that the HeNB is not operable to communicate the system information; and
   transmitting the system information to the HeNB to allow the HeNB to convey the system information to the UE upon a determination that the HeNB supports D2D communications such that the HeNB is operable to communicate the system information.

2. The method of claim 1, wherein the system information conveyed to the UE by the HeNB is conveyed using radio resource control (RRC) signaling.

3. The method of claim 1, wherein the transmitting to the HeNB comprises signaling using either an X2 or S1 interface.

4. The method of claim 1, wherein the transmitting the system information to the UE via a network entity further comprises transmitting the system information during an almost blank subframe (ABS) of the HeNB.

5. The method of claim 1, wherein the network entity comprises an MME, and wherein the transmitting further comprises transmitting an internet protocol (IP) packet including the system information to the UE.

6. The method of claim 5, wherein the IP packet is communicated through a HeNB gateway to the HeNB and to the UE.

7. The method of claim 5, further comprising receiving the system information from a macro eNB.

8. An apparatus for communication, comprising:
   means for determining whether a home evolved NodeB (HeNB) supports device to device (D2D) communications such that the HeNB is operable to communicate system information to a user equipment (UE), wherein the system information includes D2D resource allocations;
   means for transmitting the system information to the UE via a network entity upon a determination that the HeNB does not support D2D communications such that the HeNB is not operable to communicate the system information; and
   means for transmitting the system information to the HeNB to allow the HeNB to convey the system information to the UE upon a determination that the HeNB supports D2D communications such that the HeNB is operable to communicate the system information.

9. The apparatus of claim 8, wherein the system information conveyed to the UE by the HeNB is conveyed using radio resource control (RRC) signaling.

10. The apparatus of claim 8, wherein the means for transmitting to the HeNB comprises means for signaling using either an X2 or S1 interface.

11. The apparatus of claim 8, wherein the means for transmitting the system information to the UE via a network entity further comprises means for transmitting the system information during an almost blank subframe (ABS) of the HeNB.

12. The apparatus of claim 8, wherein the network entity comprises an MME, and wherein the means for transmitting further comprises means for transmitting an internet protocol (IP) packet including the system information to the UE.

13. The apparatus of claim 12, wherein the IP packet is communicated through a HeNB gateway to the HeNB and to the UE.

14. The apparatus of claim 12, further comprising means for receiving the system information from a macro eNB.

15. A computer program product, comprising:
   a computer-readable medium comprising code for:
      determining whether a home evolved NodeB (HeNB) supports device to device (D2D) communications such that the HeNB is operable to communicate system information to a user equipment (UE), wherein the system information includes D2D resource allocations;
      transmitting the system information to the UE via a network entity upon a determination that the HeNB does not support D2D communications such that the HeNB is not operable to communicate the system information; and
      transmitting the system information to the HeNB to allow the HeNB to convey the system information to the UE upon a determination that the HeNB supports D2D communications such that the HeNB is operable to communicate the system information.

16. The computer program product of claim 15, wherein the system information conveyed to the UE by the HeNB is conveyed using radio resource control (RRC) signaling.

17. The computer program product of claim 15, wherein the code for transmitting to the HeNB comprises code for signaling using either an X2 or S1 interface.

18. The computer program product of claim 15, wherein the code for transmitting the system information to the UE via a network entity further comprises code for transmitting the system information during an almost blank subframe (ABS) of the HeNB.

19. The computer program product of claim 15, wherein the network entity comprises an MME, and wherein the code for transmitting further comprises code for transmitting an internet protocol (IP) packet including the system information to the UE.

20. The computer program product of claim 19, wherein the IP packet is communicated through a HeNB gateway to the HeNB and to the UE.

21. The computer program product of claim 19, further comprising code for receiving the system information from a macro eNB.

22. An apparatus for wireless communication, comprising:
a processing system configured to:
determine whether a home evolved NodeB (HeNB) supports device to device (D2D) communications such that the HeNB is operable to communicate system information to a user equipment (UE), wherein the system information includes D2D resource allocations;
transmit the system information to the UE via a network entity upon a determination that the HeNB does not support D2D communications such that the HeNB is not operable to communicate the system information; and
transmit the system information to the HeNB to allow the HeNB to convey the system information to the UE upon a determination that the HeNB supports D2D communications such that the HeNB is operable to communicate the system information.

23. The apparatus of claim 22, wherein the system information conveyed to the UE by the HeNB is conveyed using radio resource control (RRC) signaling.

24. The apparatus of claim 22, wherein the processing system is further configured to signal using either an X2 or S1 interface.

25. The apparatus of claim 22, wherein the system information is transmitted to the UE via a network entity, and wherein the processing system is further configured to transmit the system information during an almost blank subframe (ABS) of the HeNB.

26. The apparatus of claim 22, wherein the network entity comprises an MME, and wherein the processing system is further configured to transmit an internet protocol (IP) packet including the system information to the UE.

27. The apparatus of claim 26, wherein the IP packet is communicated through a HeNB gateway to the HeNB and to the UE.

28. The apparatus of claim 26, wherein the processing system is further configured to receive the system information from a macro eNB.

\* \* \* \* \*